T. S. MAFFITT.
PROCESS OF TREATING IRON ORES
APPLICATION FILED MAY 9, 1910.
1,219,338.
Patented Mar. 13, 1917.
2 SHEETS—SHEET 1.
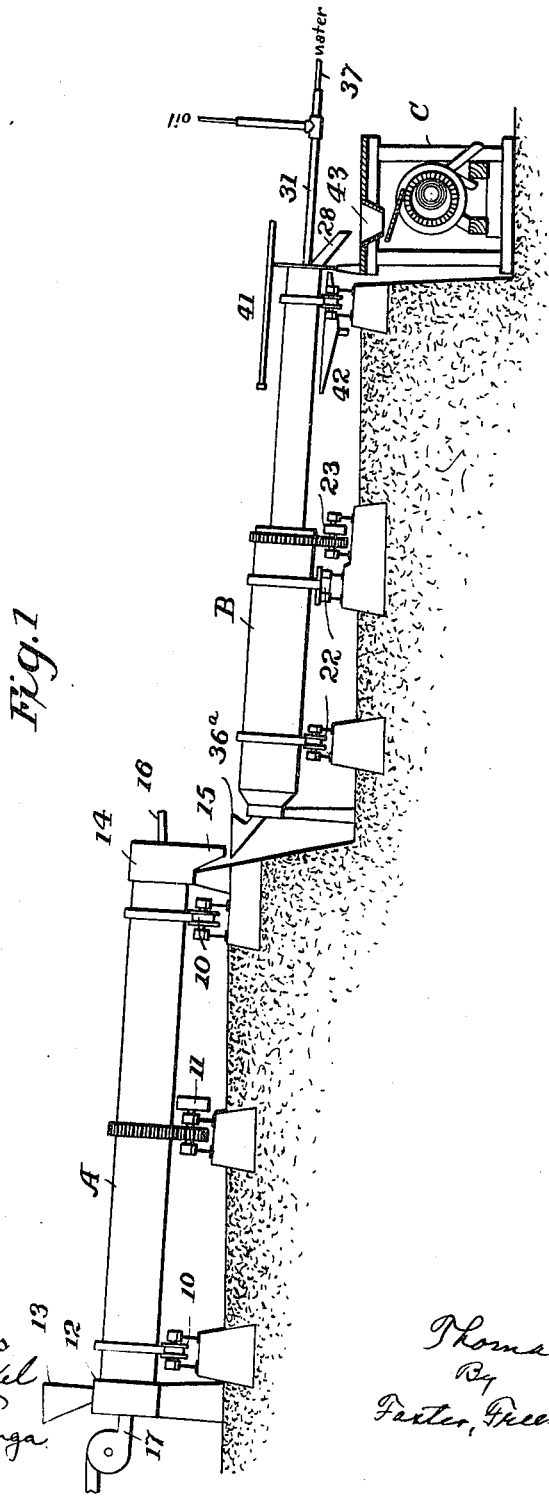

T. S. MAFFITT.
PROCESS OF TREATING IRON ORES
APPLICATION FILED MAY 9, 1910.
1,219,338.
Patented Mar. 13, 1917.
2 SHEETS—SHEET 2.
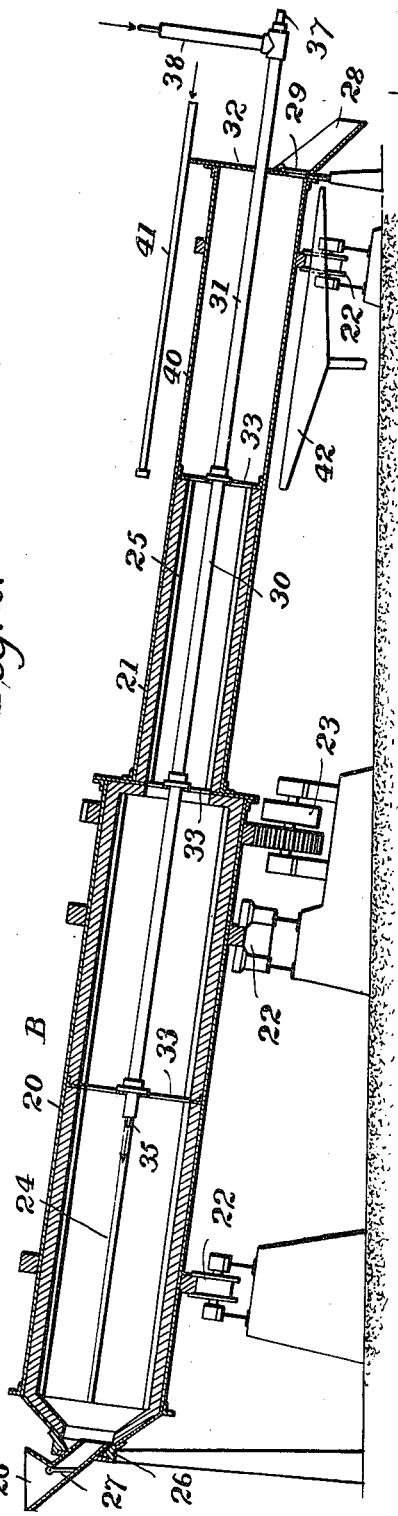
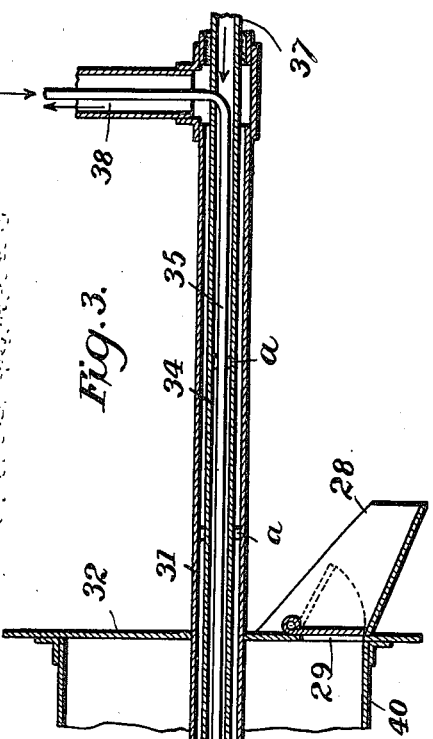
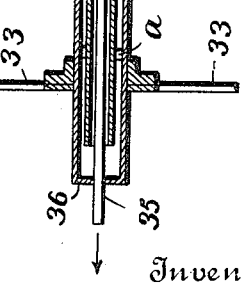
Witnesses
Inventor
Thomas S. Maffitt
By
Paxton, Freeman, Watson & Coit
Attorneys

UNITED STATES PATENT OFFICE.

THOMAS S. MAFFITT, OF ST. LOUIS, MISSOURI, ASSIGNOR, BY MESNE ASSIGNMENTS, TO MISSISSIPPI VALLEY IRON COMPANY, OF WILMINGTON, DELAWARE, A CORPORATION OF DELAWARE.

PROCESS OF TREATING IRON ORES.

1,219,338.      Specification of Letters Patent.      Patented Mar. 13, 1917.

Application filed May 9, 1910. Serial No. 560,329.

*To all whom it may concern:*

Be it known that I, THOMAS S. MAFFITT, a citizen of the United States, and resident of St. Louis, Missouri, have invented certain new and useful Improvements in Processes of Treating Iron Ores, of which the following is a specification.

This invention relates to a process of treating ores, and more particularly ores containing iron as the economic component and clay as a gangue.

It has been previously proposed to render non-magnetic iron ores magnetic by subjecting the same to a reducing agent as a hydrocarbon gas, but the treated ore has always been reduced to ordinary outside temperature before it was passed through a magnetic separator.

I have discovered that by subjecting the ore to magnetic separation while hot at a temperature considerably above normal, ores can be separated which cannot be separated at all by the process outlined above.

The process generally stated consists in rendering the ore magnetic by heat treatment and separating the ore from the gangue magnetically while in a heated state.

More specifically stated the process consists in heating the ore, subjecting the same to a reducing agent, preferably a hydrocarbon, and passing the treated ore in a heated state through a magnetic separator.

In order to describe the process and the apparatus for performing the same in detail reference is had to the accompanying drawings, in which:

Figure 1 is an elevation showing the apparatus;

Fig. 2 is a longitudinal section of the reducer; and

Figs. 3 and 4 are enlarged detail sectional views of the reducer.

The apparatus generally stated consists of a calciner A, a reducer B, and a magnetic separator C. While these separate parts of the entire apparatus may be of varied construction, an illustrative form of each will be described.

The calciner consists of a long rotary drum which is supported upon rolls 10 and is driven by means of intermeshing gears driven from a pulley 11. The drum extends into an end casing 12 provided with a charging hopper 13 and into an end casing 14 provided with a discharge chute 15. A suitable pipe 16 extends into the head 14 and terminates in a burner whereby heat may be supplied to the interior of the drum. The end casing 12 has connected thereto a fan 17 by means of which a current of air may be drawn through the drum so as to pass a blast of air past the burner and through the drum from one end to the other. The specific calciner has been described in the patent of Edward F. Goltra, 961,121, dated June 14, 1910.

The reducer consists of a long inclined cylinder composed of sections 20 and 21 of different diameters and supported by means of antifriction rolls 22. This drum is rotated by means of intermeshing gears driven by means of a pulley 23. The drum sections are lined with a heat resisting lining and have longitudinal ribs 24 and 25 formed thereon. The upper end of the drum extends into a stationary portion 26 which has mounted thereon a filling hopper 26$^a$ and is provided with a hinged gate or closure 27. The lower end of the drum extends into an end portion 32 which is provided with a discharge chute 28 closed by a hinged gate or closure 29.

A device 30 for feeding a suitable reducing agent to the apparatus extends longitudinally thereof and comprises an outside pipe 31 suitably supported in the end 32 and in spiders 33. A pipe 34 is located inside of the pipe 31 and is of smaller diameter so as to leave a free space between them. A third pipe 35 is located inside of the pipe 34 and is of smaller diameter so as to leave a free space between the pipes 34 and 35. In order to separate the different pipes a series of spacing blocks $a$ are provided. The intermediate pipe 34 is open at its end but the outside pipe 31 is closed and the pipe 35 extends through the closed end 36 and forms a tight joint therewith. The pipe 35 is connected to a suitable reservoir containing a reducing agent as crude oil or any other hydrocarbon compound. The pipes 31 and 34 form together a water jacket for the feed pipe 35, the water being admitted at 37 and discharged through pipe 38.

The lower end 40 of the drum is not provided with a heat resisting lining but is bare, and a spray pipe 41 is arranged to direct a spray of water on the part 40 so as to cool the same. The water spray is caught by a pan 42 arranged underneath the drum.

The magnetic separator C may be of any suitable construction. In this case it is of the Wenstrom type.

The ore is admitted to the hopper 13 and passed through the drum A and is there subjected to a heat treatment by means of the hot blast passing through the drum. The ore as it leaves the drum in a highly heated state is discharged into the hopper 26<sup>a</sup> and the drum of the reducer B. As the ore passes through the reducer drum the reducing agent which in this case is crude oil is admitted through the pipe 35 and as it drops on the heated ore is converted into a gas. It will be noted that the end 20 of the drum is of larger diameter than the end 21. This is done for the purpose of allowing the gas to expand and thus thoroughly reach all parts of the ore. As the ore is tumbled around in the drum all parts of the ore will be thoroughly subjected to the generated gas and will thus be rendered magnetic. As this ore reaches the lower end 40 of the drum it is cooled to some extent by the spray of water from the pipe 41. The ore in a heated state is discharged directly into the hopper 43 of the magnetic separator C and is then separated from its gangue. During the reducing operation the free access of air to the interior of the reducer apparatus must be prevented and it is for this purpose that the hinged valves or gates 27 and 29 are provided. These valves allow free admission and discharge of the ore but at the same time prevent free access of air.

The ore as it leaves the calciner will be highly heated, frequently as high as 2000° F., and the ore as discharged from the reducer will still be at a comparatively high temperature. The temperature at which the ore must be separated will vary somewhat, but I have found that for calcined brown hematite containing originally large percentages of clay gangue that the ore seems to lose its susceptibility to a magnetic field at 450° F. and below that temperature losses it very quickly, so that at ordinary temperatures it is practically non-magnetic. However if the temperature is kept above the critical point, which seems to be 450° F. for calcined brown hematite, the ore is found to be magnetic so that it can be separated by a magnetic separator without trouble.

The theory upon which the operation of this invention depends cannot be stated with definiteness. The ore as it leaves the calciner analyzes $Fe_2O_3$, but the ore upon leaving the reducing kiln contains a distinct amount of $Fe_3O_4$ and $Fe_6O_7$. However if the ore when it leaves the reducer is allowed to cool too much it loses its magnetism, but even after it loses its magnetism it still analyzes the same as before. This result leads to the conclusion that the change is of a physical nature rather than of a chemical nature. Furthermore, in breaking open a large lump, for instance a lump two inches in diameter, it is found that the interior as you go toward the inside is less magnetic than the outside. It is also found that the magnetism penetrates deeper into porous ore than into dense ore. This result leads to the conclusion that the action which takes place in the reducing apparatus forms what might be termed a magnetic film on the exterior of the ore sufficient to make it susceptible to a magnet while the ore is still hot. I do not however desire to be understood as advancing this theory as the only one or as being necessary, but merely one which may be advanced from the results obtained. The results show that when the iron ore is rendered magnetic by the process described and maintained above the critical temperature, which for calcined brown hematite clayey ores is 450° F., it can be efficiently separated magnetically, while when the temperature drops below the critical point the ore is practically non-magnetic.

It is to be understood that the ore is cooled down in the section 40 so as to prevent injury to the magnetic separator. It seems however that the permeability increases with the temperature so that it is desirable to maintain as high a temperature as possible.

The above described apparatus may be varied to suit requirements, for instance, the rotary drum A may be replaced by an ordinary vertical calcining kiln, and other types of reducers may be provided. The term "reducer" is here used to designate an apparatus for reducing the iron from a non-magnetic to a magnetic state. Generally this is accomplished by a reducing gas.

This process is especially useful and convenient when used in connection with the process described in the above mentioned patent of Edward F. Goltra. In the above patent the clay iron ore is passed through the drum and heated by the hot blast, tumbled and agitated so as to shake loose the gangue from the ore, and subjected to the hot blast so as to sweep and clean the gangue from the ore.

Now it is found that in the operation of such an apparatus it will sometimes happen that the clay will be burnt to a brick, causing the formation of "clay balls". This happens when the operator is careless in applying the blast or when the drum is not long enough, or when the material is sent through the drum at too great a rate.

By passing the ore discharged from the calciner A through the reducer B the ore is rendered magnetic and then can be easily separated from the clay balls or from the remaining clay by means of the magnetic separator.

Instead of utilizing the reducer and the magnetic separator for separating the clay balls from the ore, it is possible to perform this step of the process in other ways, for instance by means of suitable jigs. A suitable apparatus for this purpose is the well known Bradford jig. In both of the methods enumerated however, the ore is prepared in the previous step for operation in the succeeding step of the process.

It is obvious that various changes may be made without departing from the spirit of this invention and it is therefore to be understood that this invention is not to be limited to the specific arrangements or construction shown and described.

What I claim is:

1. The herein described process of clearing ore, containing iron as its economic component, from its gangue which consists in subjecting the ore and its gangue to heat so as to render the iron component of the ore magnetic, and separating said iron component from the gangue magnetically while in a heated state.

2. The herein described process of clearing ore, containing iron as its economic component, from its gangue which consists in subjecting the ore and its gangue to heat and a reducing agent so as to render the iron component of the ore magnetic, and separating the iron component of the ore from the gangue magnetically while in a heated state.

3. The herein described process of clearing ore, containing iron as its economic component, from its gangue which consists in heating the ore and its gangue, subjecting the same while hot to the action of gas containing carbon so as to render the iron component of the ore magnetic, and separating the iron component of the ore from the gangue magnetically while in a heated state.

4. The herein described process of clearing ore, containing iron as its economic component, from its gangue which consists in heating the ore and its gangue, subjecting the same while hot to the action of hydrocarbon gas generated by the heat from the heated ore so as to render the iron component of the ore magnetic, and separating the iron component of the ore from the gangue magnetically while said ore is still in a heated state.

5. The herein described process of clearing ore, containing iron as its economic component, from its gangue which consists in subjecting the ore and its gangue to heat so as to render the iron component of the ore magnetic, and separating said component from the gangue magnetically while still in a heated state and before the temperature of said ore falls below 450° F.

6. The herein described process of separating ores which consists in heating the ore and its gangue at a temperature and for a period sufficient to render the gangue easily separable from the ore, said ore containing iron as its economic component, agitating the ore and removing part of the gangue therefrom, subjecting the ore while hot to a reducing agent, and then subjecting the ore while still hot to a further concentration.

7. The herein described process of separating ores consisting in heating the ore and its gangue at a temperature and for a period sufficient to render the gangue readily separable from the ore, said ore containing iron as its economic component, loosening the gangue and removing part of the same from the ore, then rendering the iron component of the ore magnetic and finally passing the ore while still hot through a magnetic separator.

8. The herein described process of clearing iron ore of its gangue which consists in heating the ore and its gangue at a temperature and for a period sufficient to render the gangue easily separable from the ore, loosening the gangue from the ore, sweeping and cleaning the gangue from the ore, subjecting the discharged ore to a reducing agent to render the ferruginous compound of the ore magnetic, and passing the reduced ore while still hot through a magnetic separator.

9. The herein described process of treating iron ore having a compound of iron as its principal metallic constituent and containing moist clay, etc., as a gangue, which consists in heating the ore and its gangue at a temperature and for a period sufficient to render the gangue easily separable from the ore, loosening and pulverizing the gangue, cleaning and removing the gangue from the ore, rendering the ferruginous component of the ore magnetic and passing said ore while still hot through a magnetic separator.

10. The herein described process of clearing iron ore of its gangue which consists in heating the ore and its gangue at a temperature and for a period sufficient to render the gangue easily separable from the ore, loosening the gangue from the ore, subjecting the ore and its gangue to a sweeping and cleaning action, and subjecting the discharged ore to further concentration while still hot and before the temperature thereof falls below 450° F.

In testimony whereof I affix my signature in presence of two witnesses.

THOMAS S. MAFFITT.

Witnesses:
 EDWARD F. GOLTRA,
 JOHN W. PADDOCK.